Oct. 6, 1959
O. VON ZELEWSKY
2,907,478
AUTOMATIC WORKPIECE-SHIFTING MECHANISM FOR
USE WITH MACHINE TOOLS
Filed April 30, 1956
4 Sheets-Sheet 1
Fig. 1
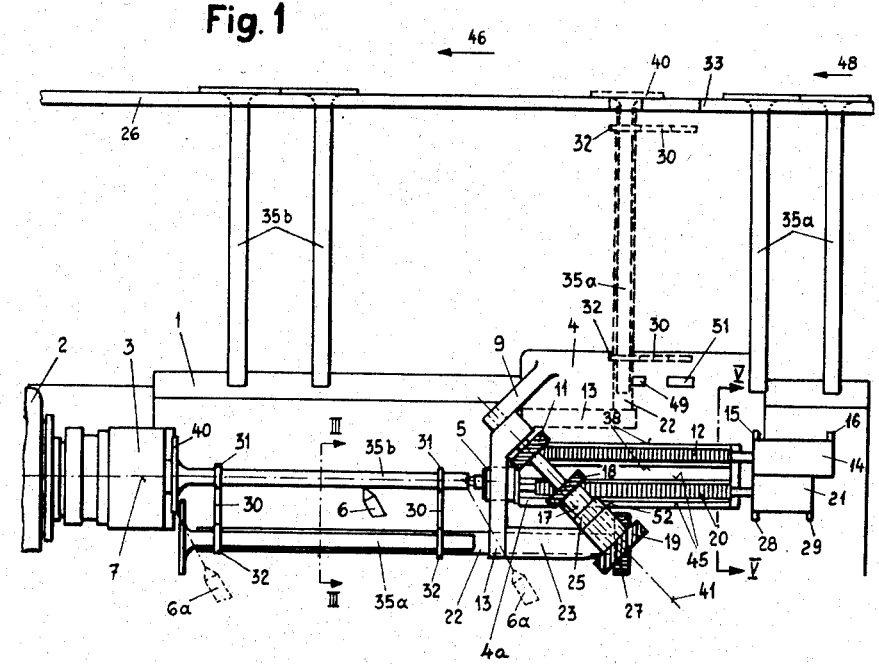
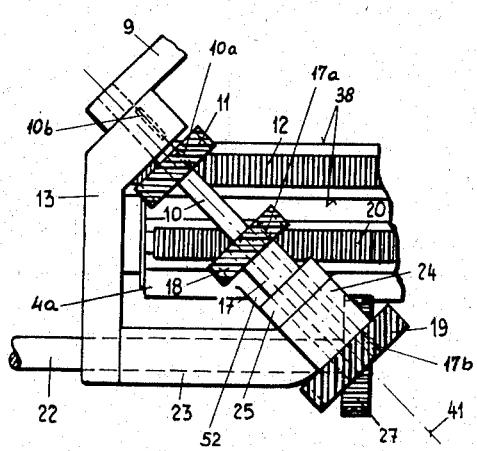
Fig. 1a
INVENTOR.
OTTOMAR VON ZELEWSKY
BY
Leon M. Strauss
AGT.

Oct. 6, 1959     O. VON ZELEWSKY     2,907,478
AUTOMATIC WORKPIECE-SHIFTING MECHANISM FOR
USE WITH MACHINE TOOLS
Filed April 30, 1956     4 Sheets-Sheet 2

INVENTOR.
OTTOMAR VON ZELEWSKY
BY Leon M. Strauss
AGT.

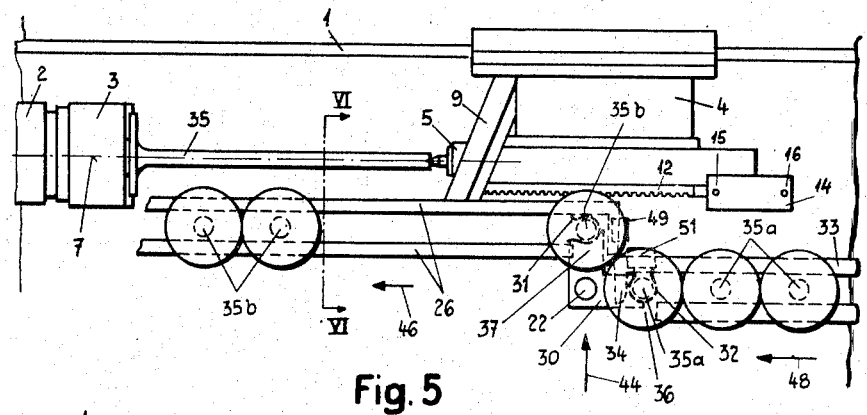
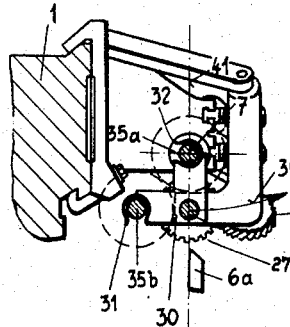
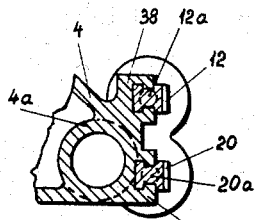
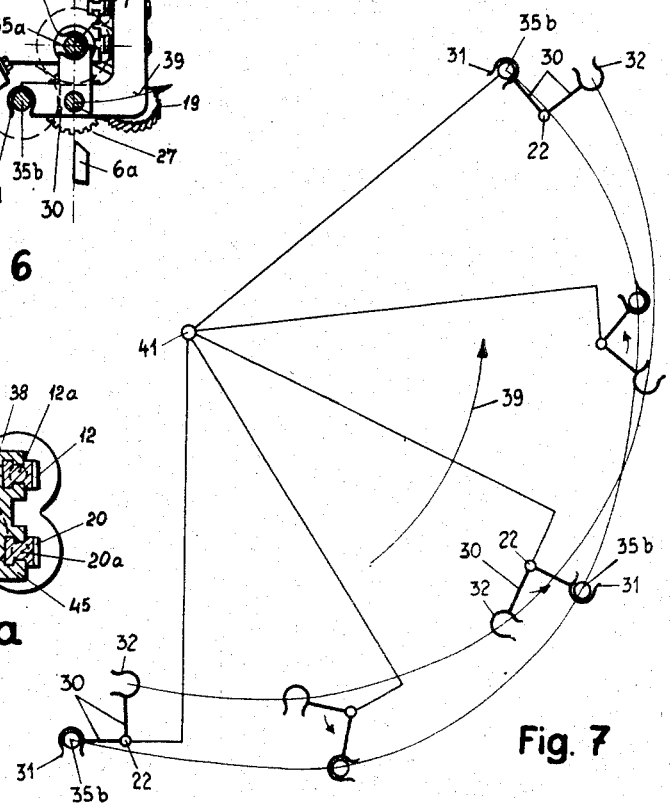

INVENTOR.
OTTOMAR VON ZELEWSKY

United States Patent Office 2,907,478
Patented Oct. 6, 1959

2,907,478

AUTOMATIC WORKPIECE-SHIFTING MECHANISM FOR USE WITH MACHINE TOOLS

Ottomar von Zelewsky, Neuhausen am Rheinfall, Switzerland, assignor to Georg Fischer Aktiengesellschaft, Schaffhausen, Switzerland, a Swiss company Application April 30, 1956, Serial No. 581,415

Claims priority, application Switzerland May 4, 1955

9 Claims. (Cl. 214—1)

The present invention relates to machine tools, and in particular to a mechanism or system for moving a workpiece into and out of its operative position in a machine tool, such as a lathe, the workpieces being moved from a vertical rest position into a horizontal working or operative position and, after termination of the machining process, again into a vertical rest position for removal from the machine tool.

The constantly expanding automation of the various operations of machine tools has made most urgent the provision of mechanisms which enable a workpiece machined by the tool to be removed from the latter along the shortest possible path and, without occurrence of any substantial inoperative intervals or loss of time, to be replaced by another workpiece to be machined.

It is, therefore, an important object of the present invention to provide means facilitating performance of machine tool operations in an automatic and substantially continuous manner without requiring full-time supervision by human attendants.

It is another object of the present invention to provide means conducive to greatly simplified and highly efficient automation systems for use in connection with machine tools, especially turning lathes.

A further object of the present invention is the provision of means enabling workpieces to be machined to be sequentially transferred from a supply or feed arrangement therefor to a machine tool, the workpieces after machining thereof being transferred sequentially from said tool to an exit or removal arrangement.

More specifically, the invention presents a solution for the above-posed problem and is characterized by the fact that a gripping or transfer arm is provided and equipped with at least one pair of grippers or claws, one gripper of each pair being constructed to hold a machined workpiece and the other gripper of each pair being constructed to hold an as yet unmachined workpiece.

The gripping arm is supported by a body which is arranged for swinging movement about an axle disposed at an inclination to the axis of workpiece rotation of the lathe or like machine tool, the gripping arm being further rotatable about its own axis in dependence on and also independently of the swinging movement of the supporting body.

These and other objects of the invention will become further apparent from the following detailed description, reference being made to the accompanying drawings showing preferred embodiments of the invention.

In the drawings:

Fig. 1 is a schematic front view of one embodiment of the workpiece-shifting mechanism constructed according to the present invention and associated with a lathe;

Fig. 1a is an enlarged view of a detail of the mechanism shown in Fig. 1;

Fig. 5 is a top plan view of the mechanism showing the swinging elements in their uppermost position;

Fig. 5a is a sectional view taken along the line V—V in Fig. 1 and illustrates details of the tailstock;

Fig. 6 is a sectional view taken along line VI—VI of Fig. 5 and illustrates the swinging elements in the position which they occupy when the workpiece is first clamped between the lathe spindles;

Fig. 7 is a schematic and diagrammatic illustration of the combined swinging movements taking place during upward swinging movement of the mechanism;

Figure 2:
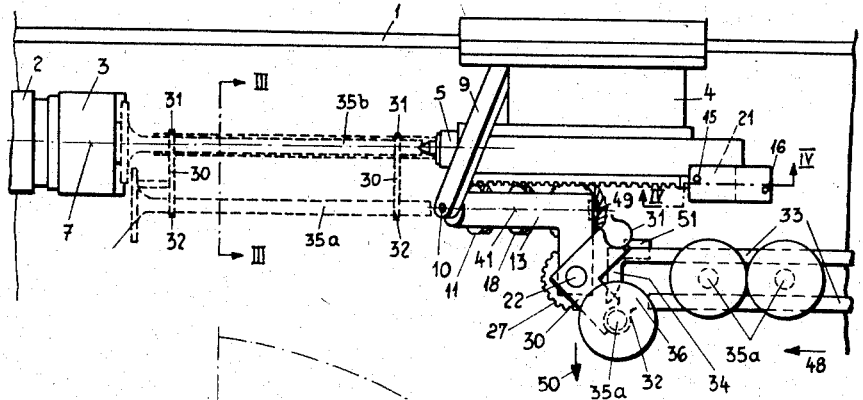
Fig. 2 is a top plan view of the mechanism shown in Fig. 1.

Referring now more particularly to Figs. 1 to 7, there is partially illustrated a copying lathe having a bed 1 and a headstock 2 provided with a chuck 3 of any desired construction. In lieu of the chuck there could be provided a dog or catch system engageable with the adjacent end of the workpiece.

A tailstock housing 4 with a cylindrical portion 4a provided with a spindle sleeve 5 is displaceably mounted on the bed 1, screw-actuated clamping means 8 with nuts 8a being provided to lock the tailstock housing 4 in position. A tool 6 of the turning or cutting type is schematically illustrated and is mounted on suitable tool slide means riding on a saddle (not shown), and in the illustrated example the tool is disposed vertically below and at an angle of 60° to the axis of rotation 7 of the workpiece or of the workpiece holding means 3, 5.

By way of explanation of Fig. 1, the tool when in its operative position and in engagement with a workpiece is illustrated in solid lines and designated by the reference character 6, said tool when in its retracted or inoperative position being illustrated in broken lines and designated by the reference character 6a. A similar scheme is employed in Fig. 8, while in Figs. 3, 6, 9 and 9a the tool, though shown in its retracted or inoperative position and designated by the reference character 6a, is nevertheless represented in solid lines.

As will be readily realized, the tool must be in its retracted position during shifting of the workpieces, i.e., during removal of a machined workpiece from the lathe and concurrent transfer of a workpiece to be machined to the lathe. In any case, of course, the arrangement of the slides or carriages on which the tool is mounted could be different than that above described.

Connected to the tailstock housing 4 is a supporting arm or bracket 9 in which a swinging or oscillating shaft 10 is supported for rotation about an axis 41. The axis 41, which is disposed in a vertical plane extending parallel to the axis of rotation 7 (Fig. 2), is oriented at an angle of 45° to the horizontal as viewed from the upper left to the lower right of Fig. 1.

The shaft 10 extends through a bushing 17 and is further supported on the tailstock housing 4 by means of a bearing 25 which surrounds and supports said bushing 17. Rigidly keyed to the oscillating shaft 10 are a supporting or swinging body 13 and a spur gear 11. The latter meshes with a rack 12 mounted in guides 38 on the tailstock housing 4 for displacement parallel to the axis of workpiece rotation 7 (see Fig. 3).

The right-hand end of the rack 12 (see Fig. 1) is connected by means of a piston rod to a piston (not shown) displaceably arranged in a cylinder 14, the length of the piston stroke being so predetermined that upon displacement of the rack 12 the shaft 10 and the supporting or swinging body 13 execute a swinging or rotary movement of 180°. Pipes or conduits 15 and 16 are provided with suitable fluid flow control means (not shown) and establish communication between the opposite ends of the cylinder 14 and a source of fluid under pressure (also not shown).

As may be seen from Fig. 1a, the bushing 17 is freely rotatable on and relative to the shaft 10. A spur gear 18 is fixed to one end of the bushing 17, while to the other end of the latter is fixed a helical gear 19. The gear 18 meshes with a rack 20 arranged in guideways 45 on the tailstock 4 for slidable displacement parallel to the axis of workpiece rotation 7.

The rack 20 is connected by means of a piston rod to a piston (not shown) displaceably arranged in a cylinder 21, the length of the stroke of the last-named piston being so predetermined that upon full displacement of the rack 20 the gear 18 executes a rotary movement of 90°.

An arm or extension 23 of the supporting or swinging body 13 is provided at one end with a guide for a gripping or transfer arm 22 and at another end with a bearing bushing or sleeve 24 through which the bushing 17 also extends. At one end of the gripping arm 22 there is arranged a helical gear 27 the axis of which is oriented at an angle of 45° to the axis 41 of the oscillating shaft 10.

The gear 27 meshes with the helical gear 19 connected to the bushing 17, the transmission ratio of these two gears being 1:1. Thus, during longitudinal displacement of the rack 20, the bushing 17 and the helical gear 19 rotate together with the gear 18, this rotation being accordingly transmitted to the helical gear 27 and the gripping arm 22.

Arranged on the gripping or transfer arm 22 are two angle members or transfer devices 30 which are spaced from one another to an extent depending on the dimensions of the workpiece to be machined. Each of the two angle members 30 is provided with a gripping element or claw 31 at one leg and with a gripping element or claw 32 at the other leg, the elements or claws 31 serving to hold the grip the workpieces 35b which have already been machined, while the elements or claws 32 are designed to hold and grip the workpieces 35a still to be machined.

Figure 3:
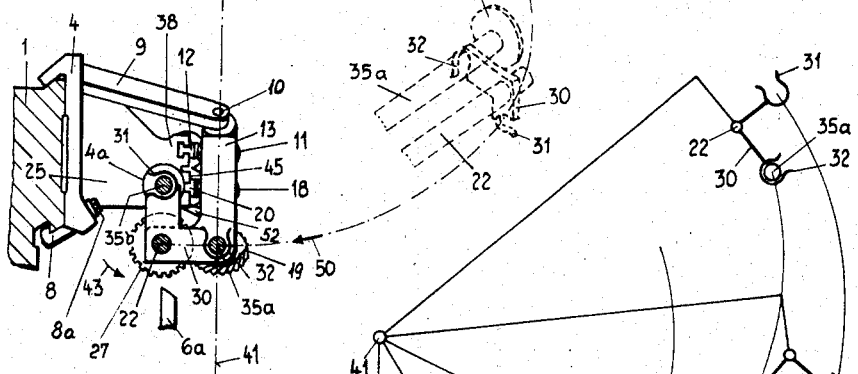
Fig. 3 is a sectional view taken along the line III—III in Fig. 1 and illustrates the swinging elements in their lowest position.
Figure 4:
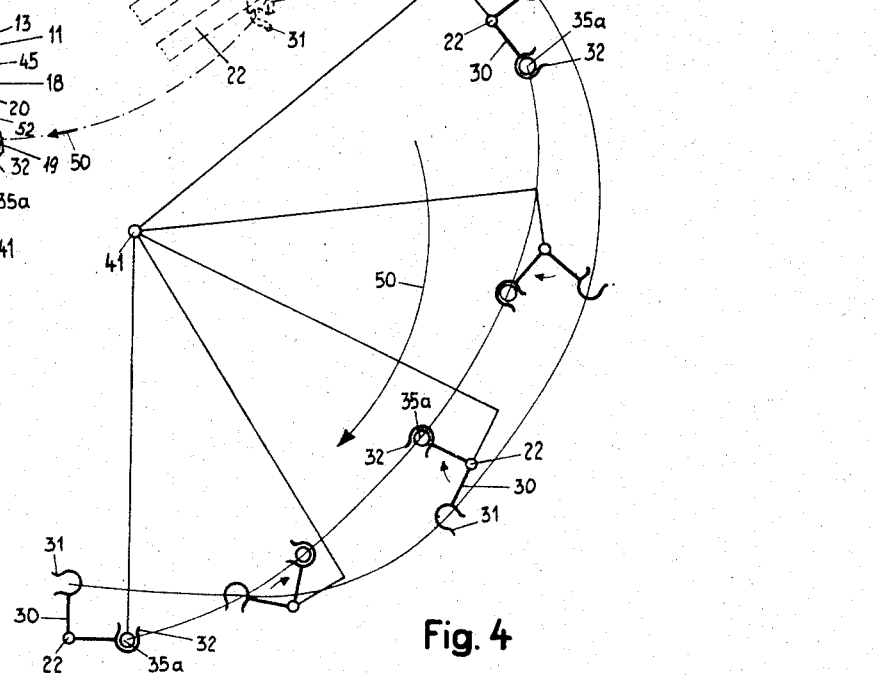
Fig. 4 is a schematic and diagrammatic illustration of the combined swinging movements taking place during downward swinging movement of the mechanism.

Both sets of gripping elements 31 and 32 on the respective angle members 30 are so constructed that they engage the respective workpieces, as for instance, 35b in Fig. 3, while moving in a predetermined direction of arrow 50 and release said workpieces, as for instance 35a in Fig. 6 while moving in the same direction as arrow 39.

Provided above the lathe adjacent the tailstock is a supply guide track defined by two parallel, horizontally spaced rails 33 along which the workpieces 35a to be machined are fed to the lathe, one of the rails presenting at one end a transverse abutment or stop 34 spaced from the other rail and defining an opening 36 adjacent the stop to enable the workpieces to be removed from the guide track (see Figs. 2 and 5).

Also arranged above the lathe adjacent the headstock thereof is a removal guide track defined by two horizontally spaced, parallel rails 26 along which the machined workpieces 35b are transported away from the lathe, the rails 26 being provided with an opening 37 through which the workpieces 35b can be introduced into the removal track. At each of the openings 36 and 37 of the rail pairs 33 and 26, respectively, there may be provided suitable locking or gate means (not shown) to prevent accidental and undesired discharge of one or more workpieces from the tracks.

For the purpose of feeding unmachined or rough workpieces 35a in the direction of the arrow 48 (to the lathe) and for the purpose of feeding the machined workpieces 35b in the direction of the arrow 46 (away from the lathe) on the rails 33 and 26, respectively, there are provided suitable transporting means (not shown) constructed to engage or grip the plate or disc-like ends 40 of the workpieces so as to either roll or slide the same along the guide tracks or passageways.

Element 32 upon its downward swinging movement (see Fig. 4) carries with it an unmachined workpiece which is to be positioned in the lathe. Element 31 on the downward movement is empty. Upon reaching the downward or the lower portion of its movement the gripping arm 22 is rotated independently of the supporting body, whereby element 32 removes the finished workpiece from the lathe and the unmachined workpiece carried by element 32 is now positioned in the lathe for the continued machining operation of this workpiece. Then, upon the upward swinging movement of the supporting body (see Fig. 7) about the axle, the machined workpiece is carried by element 31 to a removal location, whereas element 32 which previously carried the unmachined workpiece is now empty. This cycle is automatically repeated in accordance with the needs of the lathe as each workpiece is finished.

Figure 8:
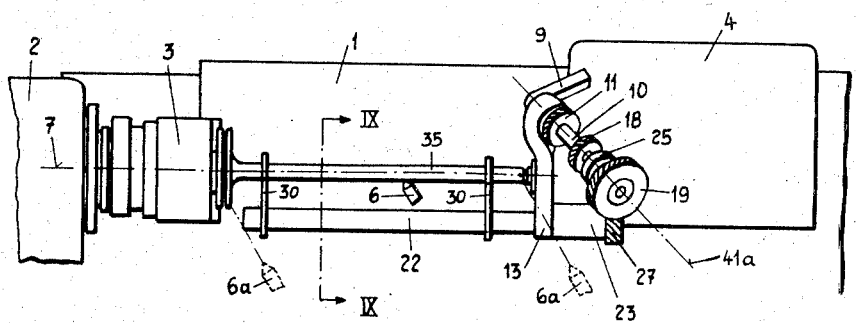
Fig. 8 is a front view of another embodiment of the mechanism according to the present invention.
Figure 9:
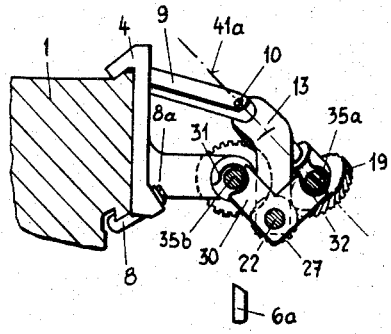
Fig. 9 is a sectional view taken along the line IX—IX in Fig. 8 and illustrates the releasing of a machined workpiece.
Figure 9A:
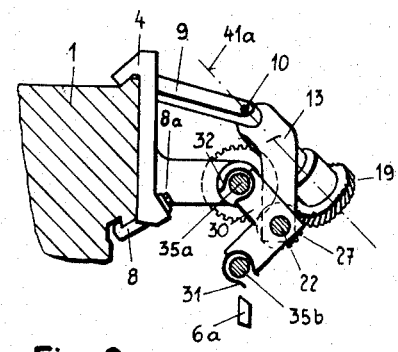
Fig. 9a is a similar sectional view taken along the line IX—IX in Fig. 8 and illustrates the mounting or clamping of a workpiece to be machined.
Figure 3A:
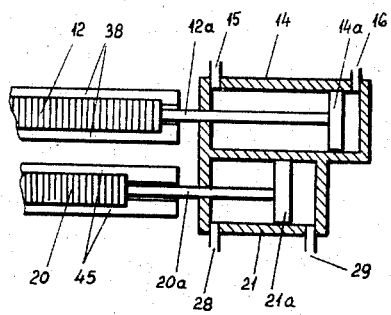
Fig. 3a is a sectional view taken along the line IV—IV in Fig. 2, and illustrates the details of the respective piston rods of cylinders shown with their connections to the racks.

Turning now to Figs. 8, 9 and 9a, it will be seen that in this embodiment the axis 41a of swinging or rotary movement of the shaft 10 lies in a plane parallel to the axis of workpiece rotation 7 (Fig. 9). However, the projection of the axis 41a onto a vertical plane is oriented at an angle of 45° to the horizontal (Fig. 8).

The transmission ratio of the helical gears 19 and 27 is, in this embodiment of the invention, 2:3 and the swinging body 13 is arranged for displacement through an angle of only 120°. In all other respects the machine tool according to this embodiment is identical to the machine tool illustrated in Figs. 1 to 7, the racks 12 and 20 not being shown in Fig. 8 for the sake of clarity.

The workpiece-shifting or transfer mechanism of Figs. 8, 9 and 9a has the advantage that the gripping arm 22 during its swinging movement does not project as far from the lathe and into the surrounding space as does the gripping arm in the embodiment of Figs. 1 to 7. Consequently, the handling and servicing of the machine are considerably simplified.

The operation of the workpiece-shifting or transfer mechanism according to Figs. 1 to 7 is as follows:

As indicated hereinabove, workpieces 35a to be machined are transported in the direction of the arrow 48 by suitable transporting means until the shaft portion of the first workpiece abuts against the stop 34. The transfer means, consisting of the swinging body 13, gripping arm 22 and the two angle members 30 provided with gripping elements 31 and 32, are swung or rotated about the axis 41 as soon as a workpiece 35a to be machined is introduced into the claws or gripping elements 32.

In Fig. 1, the parts of the mechanism are illustrated by solid lines in their lowest position, i.e., in which the gripping arm 22 is parallel to the axis of rotation 7 and is located vertically beneath and coplanar with the latter (Figs. 3 and 6). The position of the gripping arm 22 when it is vertically disposed is illustrated in broken lines in Fig. 1.

At the same time, of course, a completely machined workpiece 35b is clamped between the chuck 3 of the headstock 2 and the spindle sleeve 5 of the tailstock 4, it being understood that the workpiece 35b must now be released and removed from the lathe.

When the driving spindle in the headstock is stopped or deactuated and the tool retracted to the position 6a, the workpiece-shifting mechanism arrives in the position illustrated in Figs. 1 and 3 as more fully explained hereinafter, in which position the claws or gripping elements 31, which, like the claws 32, may be of any desired construction, engage and hold the workpiece 35b. Through suitable electric, hydraulic or pneumatic actuating means (not shown), the tailstock spindle sleeve 5 is now displaced or retracted (to the right as seen in Fig. 1) and, if necessary, the left-hand end of the workpiece 35b is pushed slightly out of the chuck 3.

The workpiece 35b is now brought to the position illustrated in Fig. 6. In order to attain this result, a fluid pressure medium is fed, by appropriate operation of the aforesaid control means, through the conduit 28 and into the cylinder 21, whereby the rack 20 is displaced to the right to effect, through the intermediary of the gear 18, the bushing 17 and the helical gears 19 and 27, a counterclockwise rotation of the gripping arm 22 through an angle of 90°, i.e., in the direction of the arrow 43.

As a consequence of this rotation, the still to be machined workpiece 35a already disposed in the gripping elements 32 arrives at its operative position between the chuck 3 and the tailstock spindle sleeve 5, at which time the latter can be displaced or protracted, preferably automatically, to the left by the above-mentioned actuating means. This workpiece 35a is now gripped and ready for machining.

When the gripping elements 32 have been released, the gripping arm 22 is swung in the direction of the arrow 39 (Figs. 6 and 7) about the axis 41. The first direction of movement of the gripping elements 32 thus lies approximately in a horizontal plane. This allows the released gripping elements 32 to slip off from the workpiece 35a.

The swinging movement of the gripping arm 22 is brought about by actuating suitable control means, preferably automatically, to enable pressure fluid to flow through the conduit 16 and into the cylinder 14 so as to displace the rack 12 from right to left. The shaft 10 supported in the bearing means 9 and 25, and thus the swinging body 13, are accordingly rotated through an angle of 180° about the axis 41 through the intermediary of the gear 11.

During this swinging movement of the body 13, the rack 20 remains in its right-hand end position and maintains the gear 18, the bushing 17 and the helical gear 19 stationary, the latter, of course, still being in mesh with the helical gear 27 on the arm 22.

Thus, as the supporting or swinging body 13 executes its swinging movement upon rotation of the axle or shaft 10, the helical gear 27 rolls along the helical gear 19 to effect a rotary movement of the gripping arm 22 and the angle or transfer members 30, as schematically illustrated in Fig. 7. During this movement, the gripping elements 32 are empty. As soon as the gripping arm 22 moves out of the range of the retracted lathe tool 6a (see Figs. 1a and 6), the next operational cycle of the lathe, for example, actuation of the driving spindle and of the transporting means, may be initiated, the machining operation continuing independently of further operation of the workpiece-shifting mechanism.

As soon as the shifting mechanism, i.e., the gripping arm 22 and the two angle members 30, and the machined workpiece 35b held thereby arrive at the upper end position as shown in Fig. 5, the gripping elements 31 move in an approximately vertical plane and in the direction of the arrow 44. In this manner, the workpiece 35b is moved through the opening 37 into the removal guide track defined between the rails 26, enabling said workpiece 35b to be moved away from the lathe and along the rails 26 by the associated transporting means.

Simultaneously, the gripping elements 32 have engaged and hold fast the next unmachined workpiece 35a at the stop 34 of the rails 33, the lower end of the shaft portion of this workpiece being blocked against movement in the direction of the arrow 44 by means of an abutment 51 disposed on the machine.

The gripping arm 22 and the transfer devices 30 are now rotated together with the gripping elements 31 and 32 in a clockwise direction and through an angle of about 45° to the position illustrated in Fig. 2. In this manner, the machined workpiece 35b, which is blocked against movement to the right by means of an abutment 49 arranged on the machine, remains between the rails 26 while the gripping elements 31 return to their starting position in empty condition. Concurrently, the elements 32 take the next rough workpiece 35a from the rails 33 through the opening 36.

This partial rotation of the gripping arm 22 is effected through admission of pressure fluid, under the action of suitable control means as aforesaid, into the conduit 29 and thence into the cylinder 21, whereby the rack 20 is moved along about one half of its available displacement path from its righthand end position to the left, the extent of this movement being determined by limiting means (not shown).

Thus, there is imparted to the gripping arm 22 through the intermediary of the gear 18, the bushing 17 and the helical gears 19 and 27 a rotation through an angle of about 45° into the position shown in Fig. 2. This effects a swinging of the shifting mechanism, i.e., of the gripping arm 22, in the direction of the arrow 50 (Fig. 4) to a so-called ready or preparatory position which is illustrated in broken lines in Fig. 3 where the entire path of movement 47 is likewise schematically indicated in broken lines.

To bring about this partial swinging movement, pressure fluid is admitted to the cylinder 14 through the conduit 15 to move the rack 12 from its left-hand end position toward the right along about one half of its available displacement path, the extent of this movement being determined, as in the case of the rack 20, by limiting means (not shown).

The gripping arm 22, together with workpiece 35a held by the elements 32, is thus brought by the gear 11, the shaft 10 and the body 13 into the desired preparatory position, where it remains until appropriate control means (not shown), for example, means for generating a control impulse as a function of the lathe operation, are actuated to permit further swinging movement. As will be readily realized, this occurs when the turning operation is completed, the driving spindle deactuated and the tool retracted from its working position 6 to its lower or inoperative position 6a adjacent the headstock of the machine tool.

In the meantime, the clockwise rotation of the gripping arm 22 from the position shown in Fig. 2 is terminated. To this end, pressure fluid is again fed through the conduit 29 into the cylinder 21 to displace the rack 20 completely to the left and to thereby complete rotation of the arm 22 via the gear 18, the bushing 17 and the helical gears 19 and 27.

Once the tool has been retracted or lowered, admission of pressure fluid through the conduit 15 effects, as described above, complete displacement of the rack 12 to its right-hand end position and thus a termination of the swinging movement of the body 13 in the direction of the arrow 50 to the position illustrated in solid lines in Fig. 1 and in broken lines in Fig. 2. In this manner, the angle members 30 assume the position illustrated in Fig. 3, since during swinging movement of the body 13 the helical gears 19 and 27 roll along one another.

Upon attainment of the lower end position, the gripping arm 22 is horizontally disposed while the gripping elements 31 engage the machined workpiece 35b (previously the first rough workpiece 35a) which can now be removed from the lathe in the manner described hereinabove. This completes the complete workpiece-shifting or transfer cycle which is, of course, carried out completely automatically.

The operation of the embodiment of the invention shown in Figs. 8, 9 and 9a is substantially identical with that of the embodiment shown in Figs. 1 to 7. The sole difference between the two is that the axis of swinging 41a for the body 13 lies in a different plane than the axis 41, so that the substantially conical path along which the gripping arm 22 moves is differently oriented in the space surrounding the machine than the path 47 shown in Fig. 3.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A mechanism for transferring an unmachined, elongated workpiece from a vertical supply location to a horizontal operative position in a lathe and for concurrently transferring a machined, elongated workpiece after termination of the machining operation from said horizontal operative position to a vertical removal location; comprising an axle rotatably arranged adjacent said supply and removal locations and inclined with respect to the axis of workpiece rotation at said operative position in said lathe, a supporting body fixed to and extending from said axle, a gripping arm rotatably carried by said body and provided with at least one pair of angularly spaced gripping elements, one of said elements being constructed to engage and grip said machined workpiece and the other of said elements being constructed to engage and grip said unmachined workpiece, gear means operatively connected to said gripping arm and to said axle, respectively, said gear means being arranged to rotate said axle for effecting rotation of said gripping arm about its own axis in accordance with swinging movement of said body due to said rotation of said axle and being further arranged to rotate said arm about its axis independently of said body, and respective pressure-actuated means for operating said gear means.

2. A mechanism for transferring an unmachined, vertically disposed workpiece from a supply location thereof into a horizontal operative position in a workpiece-rotating machine tool and for concurrently transferring a previously machined workpiece after termination of the machining operation from said horizontal operative position into a vertical position in a removal location; comprising an axle rotatably arranged adjacent said supply and removal locations and inclined at an angle to said horizontal operative position, a swinging body fixedly connected to said axle for rotation therewith, a transfer arm rotatably supported by said swinging body and provided with at least one pair of angularly spaced claws, one of said claws being constructed to engage and grip said machined workpiece and the other of said claws being constructed to engage and grip said unmachined workpiece, gear means operatively connected to said transfer arm and to said axle, respectively, said gear means being arranged to rotate said axle and swing said body for effecting rotation of said arm about its own axis in accordance with swinging movement of said body and being further arranged to rotate said arm about its axis independently of rotation and swinging movement of said axle and said body, respectively, and respective pressure-actuated means for operating said gear means.

3. A mechanism according to claim 2, said axle being arranged in a vertical plane which extends parallel to the axis of rotation of said workpiece when the latter is in said horizontal operative position.

4. A mechanism according to claim 2, said axle being arranged in a plane which extends parallel to the axis of rotation of said workpiece when the latter is in said horizontal operative position, said plane being inclined with respect to the horizontal.

5. A mechanism according to claim 2, one of said pressure-actuated means comprising a first cylinder, a first piston reciprocal within said first cylinder, and a first rack connected to said first piston and meshing with a portion of said gear means for rotating said axle and swinging said body.

6. A mechanism according to claim 5, the other of said pressure-actuated means comprising a second cylinder, a second piston reciprocal within said second cylinder, and a second rack connected to said second piston and meshing with another portion of said gear means for rotating said arm about its own axis and relative to said body, said other portion of said gear means including a bushing freely rotatable on said axle, and helical gears interconnecting said bushing and said arm.

7. A mechanism for transferring an unmachined workpiece from a supply location to an operative position in a lathe and like machine tool, and for concurrently transferring a machined workpiece upon termination of the machining operation from said operative position to a removal location; comprising an axle rotatably arranged adjacent said supply and removal locations and inclined with respect to the axis of the workpiece rotation at said operative position, a supporting body fixed to and extending from said axle, a gripping arm rotatably carried by said supporting body and provided with at least two gripping elements angularly spaced with respect to each other, one of said elements being constructed to engage and grip said machined workpiece and the other of said elements being constructed to engage and grip said unmachined workpiece, gear means operatively connected to said gripping arm and to said axle, respectively, said gear means being arranged to rotate said axle for effecting a swinging movement of said supporting body relative to said axle, thereby effecting a path of movement of the gripping arm to thus define partially an outline of a frusto-conical surface of revolution, said gear means being further arranged to rotate said gripping arm about its axis independently of said supporting body, and respective pressure-actuated means for operating said gear means.

8. A mechanism for transferring an unmachined workpiece from a supply location to an operative position in a lathe and like machine tool, and for concurrently transferring a machined workpiece upon termination of the machining operation from said operative position to a removal location; comprising an axle rotatably arranged adjacent said supply and removal locations and inclined with respect to the axis of the workpiece rotation at said operative positon, a supporting body fixed to and extending from said axle, a gripping arm rotatably carried by said supporting body and provided with at least two gripping elements angularly spaced with respect to each other, said angularly spaced gripping elements being arranged at right angles to each other, one of said elements being constructed to engage and grip said machined workpiece and the other of said elements being constructed to engage and grip said unmachined workpiece, gear means operatively connected to said gripping arm and to said axle, respectively, said gear means being arranged to rotate said axle for effecting a swinging movement of said supporting body relative to said axle, thereby effecting a path of movement of the gripping arm to thus define partially an outline of a frusto-conical surface of revolution, said gear means being further arranged to rotate said gripping arm about its axis independently of said supporting body, and respective pressure-actuated means for operating said gear means.

9. A mechanism for transferring an unmachined workpiece from a supply location to an operative position in a lathe and like machine tool, and for concurrently transferring a machined workpiece upon termination of the machining operation from said operative position to a removal location; comprising an axle rotatably arranged adjacent said supply and removal locations and inclined with respect to the axis of the workpiece rotation at said operative position, a supporting body fixed to and extending from said axle, a gripping arm rotatably carried by said supporting body and provided wtih at least two gripping elements angularly spaced with respect to each other, one of said elements being constructed to engage and grip said machined workpiece and the other of said elements being constructed to engage and grip said unmachined workpiece, gear means operatively connected to said gripping arm and to said axle, respectively, said gear means being arranged to rotate said axle for effecting a swinging movement of said supporting body relative to said axle, thereby effecting a path of movement of the gripping arm to thus define partially an outline of a frusto-conical surface of revolution, said gear means being further arranged to rotate said gripping arm about its axis independently of said supporting body, and respective pressure-actuated means for operating said gear means, said respective pressure-actuated means being constructed to transfer the machined workpiece independently of the continued machining operation.

References Cited in the file of this patent

UNITED STATES PATENTS

| | | |
|---|---|---|
| 1,933,226 | Smith | Oct. 31, 1933 |
| 2,195,625 | Knaggs | Apr. 2, 1940 |
| 2,573,660 | Brownell | Oct. 30, 1951 |
| 2,692,693 | Newburg | Oct. 26, 1954 |
| 2,714,324 | Dinsmore et al. | Aug. 2, 1955 |